United States Patent [19]  
Hansen

[11] 4,150,869  
[45] Apr. 24, 1979

[54] CONDENSATE-PROOF MIRROR

[76] Inventor: Robert B. Hansen, 6902 Shannon Dr., Huntington Beach, Calif. 92647

[21] Appl. No.: 848,293

[22] Filed: Nov. 3, 1977

[51] Int. Cl.² .............................................. G02B 7/18
[52] U.S. Cl. ...................................... 350/61; D28/68; 4/1
[58] Field of Search .................. 350/61, 63, 307, 310; 362/128, 130, 140, 141; 126/270, 271; 4/1, 146; D6/233; D28/68

[56] References Cited  
U.S. PATENT DOCUMENTS

| | | | |
|---|---|---|---|
| 291,147 | 1/1884 | Calver | 126/270 |
| 3,373,448 | 3/1968 | Butler | 350/61 |
| 3,708,218 | 1/1973 | Smillie | 350/61 |
| 4,076,374 | 2/1978 | Schwab | 350/63 |

Primary Examiner—Jon W. Henry

[57] ABSTRACT

A condensation-proof mirror, for use in such high humidity environments as conventional shower stalls or steam baths, has its reflective surface heated by diversion of a portion of shower water or live steam to a manifold on the mirror's rear surface, from which manifold the heated water or steam is distributed across the rear surface, condensing into or flowing into a catch basin or any suitable drain, heating said rear surface by convective transfer from the water or steam, and conducting the heat, so transferred, to the front reflective surface, thereby raising the temperature of that front surface above the condensation temperature for the environment impinging on that surface.

1 Claim, 5 Drawing Figures

CONDENSATE-PROOF MIRROR

BACKGROUND OF THE INVENTION

1. Field of the Invention.

This invention relates to condensation proof or fog-free mirrors and more particularly to a fog-free mirror suitable for use during normal ablution in conventional shower stalls or in standard steam baths. This invention operates through heating of its rear surface by means of a flow of the shower water or steam across its rear surface, heating that surface to the approximate temperature of the shower water or steam, and conducting heat to the front reflective surface so that said reflective surface is maintained at a temperature higher than that of the ambient, moisture laden air in the shower stall or steam bath proper, preventing condensation of that moisture on the reflective surface.

2. Description of Prior Art

Individuals often have need for use of mirrors during showers or steam baths, the most common examples of such need being males with particularly tough beards which are softened greatly by the hot water or steam and so rendered yieldable to safety razor shaving, and females with facial blemishes, or situations requiring adjustment or care best given during immersion in shower water or during steam baths. High temperatures of the moisture filled air in shower stalls or steam baths results in condensation of moisture on conventional reflective surfaces used, normally requiring that a hand held mirror have its surface frequently splashed into the shower spray, or wiped free of condensation with wash cloths and towels, while the user usually requires both hands for the operation involving said mirror.

Prevention of condensate formation on automobile windshields and special viewing windows has been achieved in a variety of ways, as noted in U.S. Pat. Nos. 1,702,877, (CLEAR VISION DEVICE FOR WINDSHIELDS) 2,059,990, (WINDSHIELD DEFROSTER) and 1,843,828, (MEANS FOR KEEPING WINDOWS, WINDSHIELDS, etc. CLEAR OF MOISTURE). U.S. Pat. No. 3,530,275, (CONDENSATION CONTROL FOR MIRRORS) a 1968 patent, provides for reflective surface heating by means of a resistive element mounted in the mirror proper and controlled by sensing of shower use through a heat sensitive switch mounted on the shower water supply line. U.S. Pat. No. 2,815,433 provides for heating a mirror's surface by means of an incandescent light bulb's radiated heat.

The device proposed herein operates on the same general principle of heating the optical surface but achieves its results in a novel and much more effective manner. In this invention, a portion of the high temperature material (viz. shower water or steam) creating the high humidity environment is directed to a manifold on the rear surface of the mirror to be acted on and is sprayed or distributed over that rear surface, heating both the rear, and, consequently, the front surface, of that mirror to the approximate temperature of the material. Since the environment of the shower stall will be cooler than the hot water being used for the shower and since steam baths are always cooler than the steam itself, the mirror's front surface will be warmer than that environment and condensation of moisture out of that environment, onto the mirror, will be positively inhibited.

OBJECTS OF THE INVENTION

Accordingly, it is an object of this invention to provide a mirror whose reflecting surface remains unobstructed by condensate in the high humidity environments of steam baths or shower stalls.

A further object of this invention is to provide a condensation-proof mirror for use in high temperature, high humidity environments, not requiring electrical heating means and utilizing heating sources readily available from the environment.

A still further object of this invention is to provide a condensation-proof mirror that is portable and readily attached to any shower for use in other than fixed or "home use" installations.

A further object of this invention is to provide an inexpensive, safe and maintenance free, condensation-proof reflective device allowing the user freedom to use both hands for shaving or other toilet purposes while taking hot water showers or steam baths.

SUMMARY OF THE INVENTION

In accordance with the objects set forth above, the present invention provides a reflective surface of mirror quality, comprised of conventional silvered glass with a heat conductive and abrasion proof rear surface or comprised of reflective metal or plastic with a rear surface of the same character as the former type, easily mountable in shower stalls or on steam bath walls and fittings, to provide for the personal toilet needs of its user. The mirror has, integral to its rear surface, and, preferably, along its upper or top most edge, a manifold with a plurality of ducts or ports, which manifold is connected by tubing or conduit means to the shower head or steam supply line. (depending on its use in either a shower or steam bath) A supply of hot shower water or live steam is led into the manifold by the tubing and sprayed or allowed to flow from the ducts or ports over the rear surface of the mirror. The flowing water or steam will convectively transfer its heat to that rear surface which will, in turn, conduct it to the front reflective surface, raising the temperature of the front surface to approximately that of the steam or shower water. Since the moisture laden air at the front surface will always be cooler than the supply source temperature (i.e. the manifold's fluid temperature) no condensate will form on the reflective surface and the mirror user will have full freedom of both hands to accomplish his toilet needs without concern for cleaning the mirror surface.

Various manifold configurations (some allowing for dripping water, others for sprayed water or jetted steam) are useable in the invention and a number of means for tapping into the high temperature supply source (said means not properly part of the invention and detailed below more for illustration of application than for exposition of the invention) are available for the different modes of use or application needs.

In addition to basic elements of the invention proposed, a plethora of embellishments are available for use therewith. A few of these embellishments are listed in the given description of preferred embodiments, but it will be obvious to the most casual observer that variations to configuration and structure will not depart from the spirit and scope of the invention, depicted, in essence, by the following described drawings and specifications.

BRIEF DESCRIPTION OF THE DRAWINGS

Application variations, modifications of configuration and structure and other advantageous features of this invention will become readily apparent from the below listed description of preferred embodiments, when considered in conjunction with the accompanying drawings, of which.

DETAILED DESCRIPTION OF THE INVENTION

Figure 1:
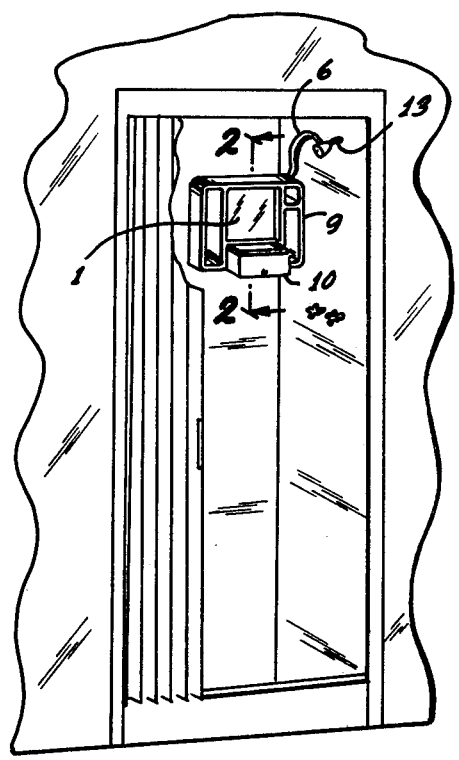
FIG. 1 is an illustration of the invention herein, mounted in an accessory cabinet and fixed to the wall of a shower stall for normal use.
Figure 2:
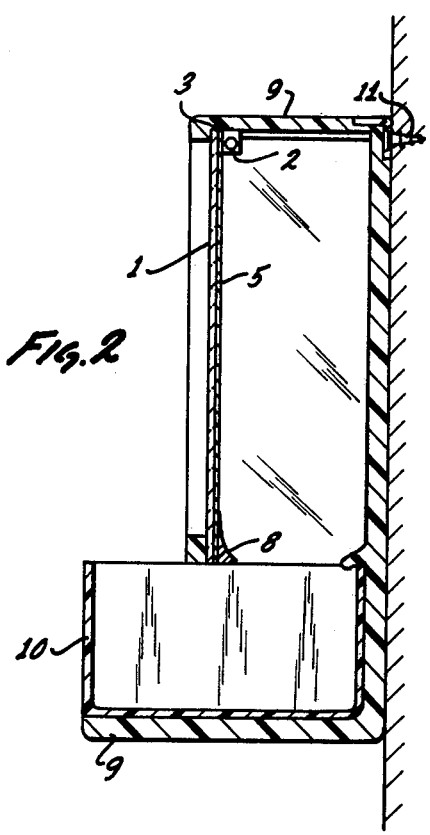
FIG. 2 presents a cut-away side view of the invention mounted in an accessory cabinet.
Figure 3:
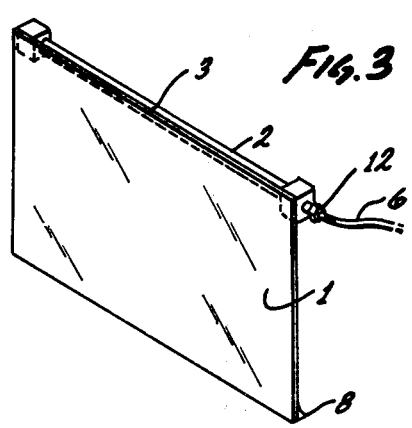
FIG. 3 presents a slant view of the device herein.
Figure 5:
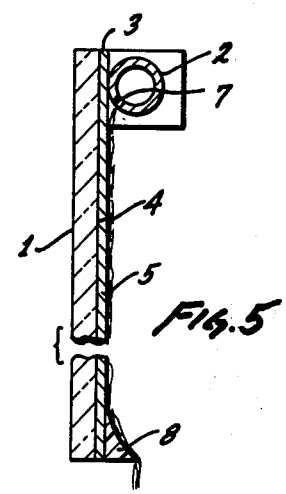
FIG. 5 presents a side view of the device.
Figure 4:
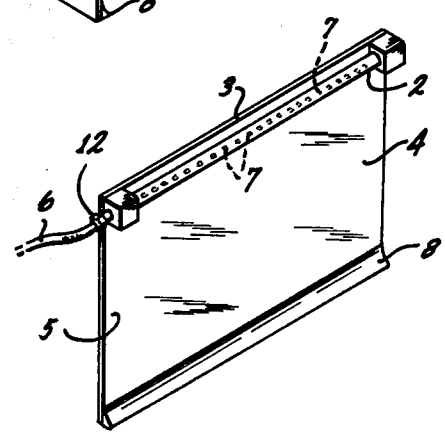
FIG. 4 presents a rear view of the device.

FIG. 3 presents a slant view of the fog-free mirror of this invention. A reflective surface, 1, is fitted with a dispenser manifold, 2, along the upper edge, 3, of its rear surface, 4. Reflective surface, 1, may be comprised of a solid section of material, such as shown in FIG. 3, with a polished face, or may be a silvered surface, 1, bonded to a rear plate, 5, as shown in FIGS. 2 and 5. These configurations will be referred to, generally, as "the mirror", throughout this description. Function of rear plate, 5, is to preclude abrasion damage to the reflective surface, 1, from flow of environmental fluid over the rear surface of silvered mirrors and no such rear plate is required in units using solid material with polished reflective surfaces.

Environmental fluid, such as shower water or live steam, is conducted to the dispenser manifold, 2, via tubing, 6, or other ducting means, from the source of such environmental fluid. An adaptive means, not a part of this invention, such as a pipe tap or strap on coupling to a hole drilled in the supply line of the live steam, or, in the neck above the shower head, provides for flow of a small amount of steam or shower water, through the adaptive means and ducting means, 6, to dispenser manifold, 2. Dispenser manifold, 2, is provided with exit ports, 7, oriented to allow environmental fluid to flow, or to be sprayed, across the upper portion of rear surface, 4. (or 5).

Impingement of the hot environmental fluid on rear surface 4, or rear plate 5, as the condition exists, will result in convective transfer of heat from that fluid to the rear surface, 4, or 5.

Heating of the rear surface, by convective transfer from the environmental fluid, will produce a temperature rise, via conductive heat transfer, through the material of the mirror, of the front surface, 1. The mirror will warm up to a temperature approximating that of the environmental fluid itself. Amount of environmental fluid required for heating the mirror will be relatively small. In prototype units, flexible tygon type tubing of $\frac{1}{8}$ inch diameter, connected to a comparably sized hole drilled in the shower head supply pipe, has provided ample flow of fluid to achieve the heating required.

As the environmental fluid impacts the rear surface, 4, or 5, of the mirror, the steam will condense (at least partially) and flow down the surface and over deflector lip, 8, into some type of receptacle. Here an orgainized accessory cabinet housing, 9, is used in conjunction with the mirror, and the housing has a removable catch basin, 10, into which the condensate flows. Where the source of environmental fluid is the shower supply, the supply water itself is captured in basin, 10. This residue, some of its original heat having been transferred to the mirror, is still hot, and is useable for rinsing safety razors, straight razors, or for any need found by the user of the device.

Since temperature of the high humidity air in the shower stall (or steam room) will always be less than the temperature of the environmental fluid, (i.e. shower water or steam) and since the mirror temperature will be greater than that of the air, (the mirror temperature being approximately that of the environmental fluid) moisture cannot condense out of the air onto the mirror.

Means to suspend or mount the mirror are not part of this invention. Where the mirror is mounted in an accessory cabinet such as, 9, in which shampoos, medication and shaving paraphenalia may be stored, simple wall attachment means such as wood screws, 11, or hooks or wires between the cabinet and walls will suffice. Such an accessory cabinet might be fitted with low voltage lighting means or safety designed lighting of a variety of designs. Such lighting means may be of material assistance to the user and is an embellishment not to be considered part of the invention.

Ducting means, 6, between the source of environmental fluid and the mirror may be mounted to the wall of the shower stall permanently or by means of such devices as supporting sunction cups with hooks or clamps. Simple adapter means, 12, provides for coupling ducting means, 6, to dispenser manifold, 2. In completely portable configurations of the invention herein, ducting means, 6, would be coupled to a special supply end adapter of elastic material allowing its being stretched over any of a variety of shaped shower head pores, or a limited area of the exit face of the shower head, as supply source for dispenser manifold, 2. In these completely portable versions, a support means could be devised to clamp over the shower head supply pipe, 13, for support of the mirror close to its supply of environmental fluid. Needless to say, steam bath adapter means could also be devised, but since these adapter means are not part of the invention, the user is left to his ingenuity in devising methods of obtaining environmental fluid and means of suspending the mirror for maximum ease of use.

I claim:

1. In a condensate-proof mirror for use in a shower or steam bath environment and including means for contacting a rear-reflective surface of the mirror with a stream of downwardly flowing shower or steam bath-derived hot fluid for heating of a front reflective mirror surface of the condensate-proof mirror to a temperature higher than that of ambient moisture laden air of the shower or steam bath, the improvement comprising:

housing means including utility storage means and a removable open-top catch basin for collecting downwardly flowing hot liquid discharging from a lower end of the rear surface of the mirror, a substantial portion of the open top of said catch basin extending forwardly of the forward surface of the reflective mirror surface wherein hot liquid in said catch basin is readily accessable to a user for purposes attendant showering or steam bathing, and a deflector lip integral with the rear surface of the mirror adjacent the lower end of the rear surface of the mirror for deflecting hot liquid rearwardly into the catch basin.

* * * * *